US005417093A

United States Patent [19]

Heiberg

[11] Patent Number: 5,417,093

[45] Date of Patent: May 23, 1995

[54] PROPELLER LOCK

[76] Inventor: Martin D. Heiberg, 7548 W. Bluefield, Glendale, Ariz. 85308

[21] Appl. No.: 145,564

[22] Filed: Nov. 4, 1993

[51] Int. Cl.[6] .............. F16B 41/00

[52] U.S. Cl. .............. 70/232; 70/18; 70/424; 416/244 B

[58] Field of Search .............. 70/14, 158-173, 70/455, 229-232, 416, 417, 423, 424, 18, 19; 416/93 A, 146 B, 244 B, 245 A, 247 A, 247 R

[56] References Cited

U.S. PATENT DOCUMENTS

| | | | |
|---|---|---|---|
| 89,930 | 5/1869 | Hall . | |
| 280,912 | 7/1883 | Connolly . | |
| 566,932 | 9/1896 | Patrick . | |
| 748,720 | 1/1904 | Glazier . | |
| 1,690,461 | 11/1928 | Sieben . | |
| 1,780,994 | 11/1930 | Caldwell . | |
| 1,830,667 | 11/1931 | Lolley . | |
| 3,156,256 | 11/1964 | Weaver | 137/385 |
| 3,172,282 | 3/1965 | Heckrotte | 70/178 |
| 3,732,033 | 5/1973 | Macchi | 416/244 |
| 3,759,076 | 9/1973 | Reese | 416/244 B |
| 3,981,165 | 9/1976 | Wersinger | 416/146 B X |
| 3,981,617 | 9/1976 | Milewicz | 416/244 |
| 4,167,862 | 9/1979 | Gould | 416/146 B X |
| 4,257,247 | 3/1981 | Sims | 416/146 B X |
| 4,502,306 | 3/1985 | Scammacca | 70/159 |
| 4,538,434 | 9/1985 | Janzen, Sr. | 70/178 |
| 4,538,962 | 9/1985 | McCain | 416/244 B X |
| 4,541,256 | 9/1985 | Green | 70/232 |
| 4,561,273 | 12/1985 | Robinson | 70/424 X |
| 4,570,470 | 2/1986 | Gray | 70/424 X |
| 4,630,456 | 12/1986 | Nielsen, Jr. | 70/232 |
| 4,645,422 | 2/1987 | Brushaber | 70/232 X |
| 4,715,783 | 12/1987 | Wade | 416/244 B X |
| 4,736,603 | 4/1988 | Brushaber | 70/232 |
| 4,777,811 | 10/1988 | Binkley | 70/178 |
| 4,798,069 | 1/1989 | DeForrest | 70/424 X |
| 4,872,327 | 10/1989 | Wagner | 70/175 |
| 5,033,280 | 7/1991 | Johnson | 70/455 X |
| 5,182,928 | 2/1993 | O'Fearna | 70/232 |
| 5,193,366 | 3/1993 | Brinkman | 70/232 X |

*Primary Examiner*—Peter M. Cuomo
*Assistant Examiner*—Suzanne L. Dino
*Attorney, Agent, or Firm*—Richard G. Harrer

[57] ABSTRACT

A lock to prevent theft of a marine propeller assembly having a cylindrical shaped housing on which are exteriorly mounted a series of propeller blades, with the open end of the propeller housing being flared outwardly, the assembly further being mountable to a propeller shaft by means of a retaining nut. The propeller lock substantially covers the open end of the propeller assembly and effectively prevents access to the retaining nut and therefore prevents theft of the assembly. The lock has a flat, generally circular shaped face section, with a relatively short wall depending from the perimeter of the face section. The circular shaped face section is formed of two semi-circular sections with the two semi-circular sections being hinged at an edge so they can be closed to form the circular section or opened to form the two semi-circular sections. The depending relatively short wall is angled at an acute inwardly toward the center of the generally circular shaped face section. Means are provided to lock the two semi-circular sections together. In operation, the circular face sections open so that the two semi-circular sections are spread apart and then the lock is placed over the flared end of the propeller housing and the two semi-circular sections are then brought together and locked.

3 Claims, 1 Drawing Sheet

PROPELLER LOCK

The present invention pertains generally to a device for the prevention of theft of marine propellers and, more specifically, to a locking device especially well suited for use in connection with propellers found in outboard and inboard-outboard marine drive units.

BACKGROUND OF THE INVENTION

Most inboard and outboard power motors have bladed propellers that are mounted and retained on rotating propeller shafts by a releasable securing mechanism, usually castellated nuts threaded on the propeller shaft where one of the castellated openings is arranged to receive a cotter pin, for example, that is inserted in a transverse opening provided in the shaft. An arrangement such as this prevents retrograde movement of the castellated nut so as to assure positive retention of the propeller on the shaft during use.

Although such an arrangement is very effective to prevent the accidental loss of the propeller from the shaft during use, it does make it quite easy for thieves to quickly remove and appropriate the propeller when the motor is left unattended. When a propeller is stolen, not only is the owner faced with purchasing a replacement which is usually quite costly, but there are times when the theft takes place at locations where trips can be spoiled simply because there is no way the boat can be operated without a propeller and a replacement propeller is just not readily available.

In view of the foregoing, it is appreciated that there is a need for some type of locking device to prevent unauthorized removal of a marine propeller. Various propeller locks have been proposed in the past. Some of the devices are designed to remain in place during regular use of the propeller and examples thereof are disclosed in U.S. Pat. Nos. 3,732,033 and 3,981,617. Other propeller security devices are found in U.S. Pat. Nos. 3,759,076, 3,981,165 and 4,257,247. The latter devices are of the type which must be removed during use of the propeller drive system. Although the locking devices disclosed in the foregoing U.S. patents are likely to be effective, they are, for the most part, quite complicated and thus rather expensive to manufacture. Thus there is a need to provide a simple yet highly effective device for preventing the theft of marine propellers. The need is for a device which is both strong and durable, economical to manufacture, and easy to use.

SUMMARY OF THE INVENTION

In accordance with my invention, a propeller lock is provided which is designed to be used to prevent theft of a particular type of propeller assembly which is available on a substantial number of motors. Such a propeller assembly usually comprises a cylindrical shaped housing and on which are typically mounted three, four or five propeller blades. This cylindrical propeller housing surrounds a propeller shaft and customarily a nut is used to secure the propeller assembly to the propeller shaft—usually the nut being of the castellated type as previously described. A particular type of propeller assembly which is available on a substantial number of motors, has an open end which is flared outwardly. That is, the exterior diameter of the cylindrical housing of the propeller assembly at its very end is larger than the diameter of the propeller housing at, for example, where the blades are externally mounted to the housing. In operation my propeller lock takes advantage of this enlarged portion of the propeller housing to prevent unauthorized removal of the propeller assembly.

The lock itself substantially covers the open end of the propeller housing and can be described as having a flat generally circular shaped face section, with a relatively short wall depending from the entire perimeter of the face section. The circular shaped face section is formed of two semi-circular sections with the two semi-circular sections being hinged at an edge so they can be closed to form the circular section or opened to form two semi-circular sections. In a preferred embodiment the two semi-circular sections are identical. The depending curved wall is angled inwardly toward the center of the section. Means are provided to lock the two semi-circular sections together and this is advantageously provided at a point opposite to the hinge.

In operation, the circular face section is opened so that the two semi-circular sections are spread apart somewhat and then the propeller lock device is placed over the flared end of the propeller housing and the two semi-circular sections are then brought together. Since the depending wall which surrounds the perimeter of this circular face section is angled inwardly and the end of the propeller housing is flared outwardly, the inwardly angled walls of the propeller lock engage with the outwardly flared wall of the propeller housing. When the two sections are locked together, the device cannot be removed from the propeller assembly and access to the nut of the propeller shaft is prevented, effectively preventing removal of the propeller assembly.

DETAILED DESCRIPTION OF A PREFERRED EMBODIMENT

Figure 1:
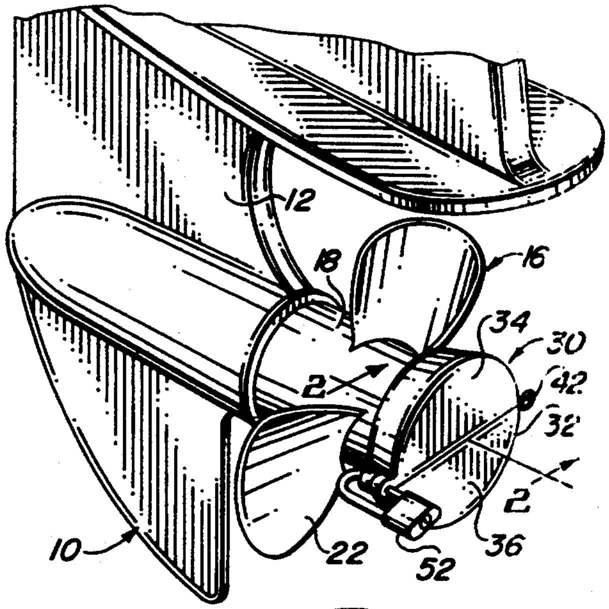
FIG. 1 Is a fragmentary perspective view of the lower end of a typical outdrive or outboard motor unit with the propeller locking device of the present invention mounted on the housing of a marine propeller assembly.
Figure 2:
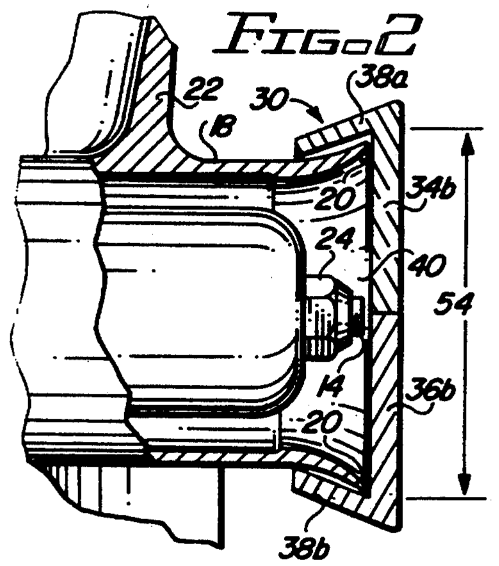
FIG. 2 is a cross sectional view taken on line 2—2 of FIG. 1.
Figure 4:
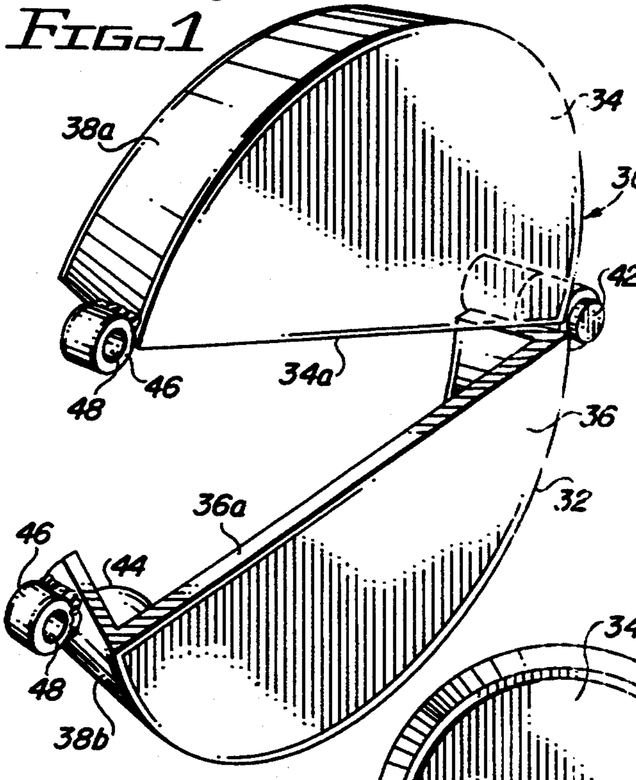
FIG. 4 is a front perspective view of the locking device.
Figure 3:
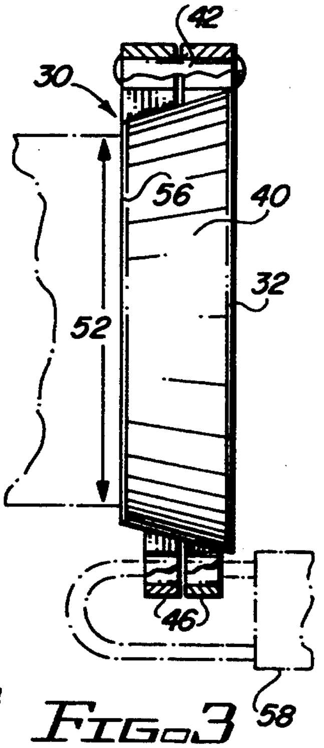
FIG. 3 is a vertical section of the lock device showing the device in a locked position.
Figure 5:
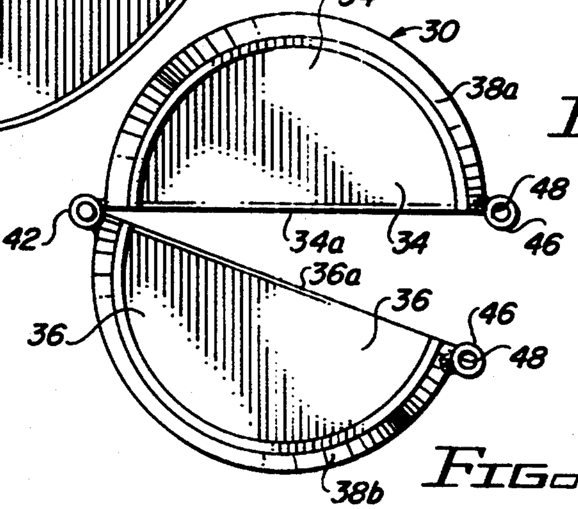
FIG. 5 is a rear perspective view of the locking device of this invention.

As shown in FIG. 1, the numeral 10 generally designates the lower end of a typical outboard motor or outdrive unit. Motor 10 includes a housing 12 from which a driven propeller shaft 14 ultimately projects rearwardly as shown in FIG. 2. A marine propeller assembly, referred to in general by the reference numeral 16, is formed of a cylindrical shaped outer sleeve portion or housing 18 with a series of propeller blades 22 mounted to housing 18. The propeller assembly is mounted to shaft 14 by means of nut 24. As shown best in FIG. 2, the open end 20 of cylindrical housing 18 is flared outwardly. That is, the exterior diameter of the open end of housing 18 at point 20 is greater than the exterior diameter of housing 18 at, for example, the point where the propeller blades are mounted. The propeller locking device of this invention takes advantage of this outwardly flared end of the cylindrical propeller housing. Numeral 30 generally designates the propeller locking device of this invention and, as shown best in FIGS. 1 and 2, the propeller locking device is designed to substantially enclose the opening to the propeller housing and thus effectively prevent access to retaining nut 24. Since access to the retaining nut is prevented, removal of the propeller assembly is also prevented. The structure of the propeller locking device 30 is best shown in FIGS. 4 and 5 and the device includes a generally circular face section 32 made up of two semi-circular sections 34 and 36. In a preferred embodiment the two sections are substantially identical. Each of sections 34 and 36 includes flat face plates **34*b* and 36*b* and relatively short wall 38*a* and 38*b* depending from the curved perimeter of each section. It is important to observe that curved walls 38*a* and 38*b* are angled inwardly toward the center of circular section 32; that is, angle 44 is an acute angle, usually about 84 degrees. The two semi-circular sections are joined together by hinge means 42 enabling them to swing in a plane between an open position as shown in FIGS. 4 and 5 or a closed position as shown in FIGS. 1–3. When sections 34 and 36 are swung to a closed position, straight edges 34*a* and 36*a* of each section mate together and the two closed sections form a circular shaped cavity 40 having curved walls 38*a* and 38*b* and flat face plates 34*b* and 36*b* and arc opening 56 to the cavity. Each of semi-circular sections 34 and 36 are provided with an ear 46, each ear having aperture 48. When the semi-circular sections are joined together as shown in FIG. 3, the apertures in each ear line up and a padlock 58** may be used to lock the sections together as shown in FIGS. 1 and 3.

In operation, when it is desired to attach the propeller locking device 30 to the propeller assembly 16, the two semi-circular sections 34 and 36 are swung apart as shown in FIGS. 4 and 5. Thereafter the device 30 is placed over the end 20 of propeller assembly 18 and then the two sections are brought together as shown in FIGS. 1 and 2. A padlock can then be used to lock the two sections together as shown in FIGS. 1 and 3. Once the locking device 30 is in place over the end of the propeller housing as shown in FIG. 2, access to the nut 24 on propeller shaft 14 is not possible, thus preventing removal of the propeller assembly.

It is important that certain dimensions of the propeller lock be observed for it to operate properly and protect the propeller assembly from unauthorized removal. First of all, the diameter of the interior of the cavity 40 taken at its base and as shown at dimension 54 of FIG. 2 should be substantially equal to or preferably slightly larger than the maximum exterior diameter of the open and outwardly flared end 20 of propeller housing 18. Secondly, the diameter of the opening 56 of cavity 40 as shown in dimension 52 of FIG. 3 should be substantially equal to or preferably slightly larger than the exterior diameter of the main portion of the propeller housing. To properly function, dimension 52 will always be less than dimension 54 and dimension 52 will always be less than the exterior diameter of the open and outwardly flared end 20 of housing 18. When the foregoing are observed, the propeller locking device will be easy to mount over the end of the propeller assembly and swing the two semi-circular sections 34 and 36 together and then apply appropriate means to lock the sections together, such as padlock 58.

What is claimed is:

1. A locking device for preventing unauthorized removal of a marine propeller assembly from inboard and outboard marine drive units, said propeller assembly comprising a generally cylindrical shaped housing on which are exteriorly mounted propeller blades with the open end of said housing being flared outwardly, said propeller assembly being mountable to a propeller shaft by means of removable retaining means; said locking device comprising a pair of substantially flat generally semi-circular shaped sections with hinge means interconnecting said sections so that said sections may be moved in a plane between an open position and a closed position and wherein in said closed position each of said sections mate together to form a generally circular section, each of said sections having a curved perimeter and a curved wall which depends from the curved perimeter of each of said sections, said curved wall being angled inwardly at an acute angle toward the center of said circular section, and when said sections are in a closed position, a circular shaped cavity is formed having a base formed of said generally circular section and said curved sidewall with a circular opening to said cavity which opening extends throughout the entire area surrounded by said wall and means to lock said sections together, whereby access to said retaining means may be prevented by causing said sections of said locking device to be swung apart to an open position, thereafter placing said device over the outwardly flared end of said propeller housing, moving said sections together to a closed position whereby the inwardly angled wall of said device engages with the outwardly flared end of said housing and thereafter locking said sections together whereby access to said retaining means is prevented.

2. The device of claim 1 wherein said sections are substantially identical.

3. The device of claim 2 wherein the diameter of the interior of said cavity taken at said base is substantially equal to or larger than the maximum exterior diameter of the outwardly flared end of said housing and wherein the diameter of the opening to said cavity is substantially equal to or larger than the exterior diameter of the main portion of said housing and wherein said second recited diameter is less than said first recited diameter.

* * * * *